US006330538B1

(12) United States Patent
Breen

(10) Patent No.: US 6,330,538 B1
(45) Date of Patent: Dec. 11, 2001

(54) PHONETIC UNIT DURATION ADJUSTMENT FOR TEXT-TO-SPEECH SYSTEM

(75) Inventor: Andrew P Breen, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 08/973,737

(22) PCT Filed: Jun. 13, 1996

(86) PCT No.: PCT/GB96/01430

§ 371 Date: Dec. 11, 1997

§ 102(e) Date: Dec. 11, 1997

(87) PCT Pub. No.: WO96/42079

PCT Pub. Date: Dec. 27, 1996

(30) Foreign Application Priority Data

Jun. 13, 1995 (DE) .......... 95304079

(51) Int. Cl.[7] .......... G01L 13/08

(52) U.S. Cl. .......... 704/260; 704/267

(58) Field of Search .......... 704/260, 267

(56) References Cited

U.S. PATENT DOCUMENTS 5,479,564 * 12/1995 Vogten et al. .......... 704/267
5,832,434 * 11/1998 Meredith .......... 704/260
6,038,533 * 3/2000 Buchsbaum et al. .......... 704/260
6,064,960 * 5/2000 Bellegarda et al. .......... 704/260

FOREIGN PATENT DOCUMENTS 0 327 266 8/1989 (EP) .......... G06F/15/38

OTHER PUBLICATIONS

Patent Abstract of Japanese Appl. No. 05–108084, vol. 17, No. 464 (P–1599), Aug. 24, 1993.
Patent Abstract of Japanese Appl. No. 06–161491, Vol. 18, 484 (P–1798), Sep. 8, 1994.
Ahn et al., "The Rules in a Korean Text–to–Speech System", Proceedings of the International Conference on Sopken Language Processing 1990, vol. 2, Nov. 18–22, 1990, pp. 777–780.
Bailly, "Integration of Rhythmic and Syntactic . . . ", Speech Communication, vol. 8, No. 2, Jun. 1989, pp. 137–146.
Dettweiler, "An Approach to Demisyllable Speech . . . ", International Conference on Acoustics, Speech and Signal Processing 1981, vol. 1, Mar. 30, 1981—Apr. 1, 1981, pp. 110–113.
Hirokawa et al., "High Quality Speech Synthesis . . . ", IEICE Transactions on Fundamentals of Electronics, Communications and Computer Sciences, vol. 76A, No. 11, Nov. 1, 1993, pp. 1964–1970.
Ladd et al., "Modeling Rhythmic and Syntactic . . . ", European Conference on Speech Technology, vol. 2, Sep. 1987, pp. 29–32.
Van Santen, "Assignment of Segmental Duration . . . ", Computer Speech and Language, vol. 8, No. 2, Apr. 1, 1994, pp. 95–128.
Crystal et al, "Segmental Durations in Connected–Speech Signals: Current Results", Journal of the Acoustical Society of America 83(4), pp. 1553–1573, Apr. 1988.

(List continued on next page.)

*Primary Examiner*—Talivaldis Ivars Smits
(74) *Attorney, Agent, or Firm*—Nixon & Vanderhye P.C.

(57) ABSTRACT

Input text is converted to a sequence of representations of syllables or other phonetic units and stored portions of data are retrieved to generate waveforms corresponding to the syllables. In order to determine durations for the syllables, a constant duration is defined corresponding to a regular beat period and adjusted in accordance with the nature of the syllable and/or its context within the sequence.

26 Claims, 1 Drawing Sheet

OTHER PUBLICATIONS

Weightman, "Segmental Durations in the Vicinity of Prosodic Phrase Boundaries", Journal of the Acoustical Society of America 91 (3), pp. 1707–1717, Mar. 1992.

Breen, "A Comparison of Statistical and Rule Based Methods of Determining Segmental Durations", Proceedings of ICSLP '92, pp. 1199–1202.

Breen et al, "A Method of Estimating Segmental Durations", Proceedings of the Institute of Acoustics, (1994), pp. 343–350.

Riley, "Tree–Based Modelling of Segmental Durations", Talking Machines, Theories, Models, and Designs, Ed. Baily, Benoit, North–Holland, pp. 265–275, (1992).

Klatt, "Synthesis by Rule of Segmental Durations in English Sentences", Frontiers of Speech Communication Research, Ed. Lindblom and Ohman, Academic Press, pp. 287–300 (1979).

van Santen, "Using Statistics in Text–to–Speech System Construction", Proceedings of the Second ESCA/IEEE, Workshop on Speech Synthesis, pp. 240–243, (1994).

Sharman, "Concatenative Speech Synthesis Using SubPhoneme Segments", Proceedings of the Institute of Acoustics, pp. 367–374, (1994).

Campbell et al, "Segmant Durations in a Syllable Frame", Journal of Phonetics (1991), Special Issue on Speech Synthesis, 19, pp. 37–47.

Campbell, "Syllable–Based Segmental Duration", Talking Machines, Theories, Models and Designs, Ed. Baily, Benoit, North–Holland, pp. 211–224, (1992).

Campbell, "Predicting Segmental Durations for Accomodation within a Syllable–Level timing Framework", Conference Proceedings of Eurospeech '93, (1993), pp. 1081–1085.

Local et al, "A Model of Timing for Non–Segmental Phonological Structure", Conference Proceedings of the Second ESCA/IEEE Workshop on Speech Synthesis, pp. 236–239, (1994).

Breen, The BT Laureate Text–to–Speech System, Proceedings of the Second ESCA/IEEE Workshop on Speech Synthesis, pp. 195–198, (1994).

* cited by examiner

PHONETIC UNIT DURATION ADJUSTMENT FOR TEXT-TO-SPEECH SYSTEM

BACKGROUND OF THE INVENTION

1. Field of the Invention

The present invention is concerned with speech synthesis, and particularly, though not exclusively, with text-to-speech synthesisers which operate by concatenating segments of stored speech waveforms.

2. Related Art

Various prior art systems have been devised for converting text to synthesized speech. While these systems provide associated techniques to determine the timing and duration of synthesized phonetic units, it is believed that there is room for improvement in this regard.

BRIEF SUMMARY OF THE INVENTION

According to the present invention there is provided a speech synthesiser comprising:

- means for supplying a sequence of representations of phonetic units;
- means for retrieving stored portions of data to generate waveforms corresponding to the phonetic units;
- means for determining durations for the phonetic units: and
- means for processing the portions of data to adjust the time durations of the waveforms according to the determined durations;
- wherein the determining means is operable to define a constant duration corresponding to a regular beat period and to adjust that duration in dependence on the nature of the phonetic unit and/or its context within the sequence.

Preferably the stored data are themselves digitised speech waveforms (though this is not essential and the invention may also be applied to other types of synthesiser such as formant synthesisers). Thus in a preferred arrangement the synthesiser includes a store containing items of data representing waveforms corresponding to phonetic sub-units, the retrieving means being operable to retrieve, for each phonetic unit, one or more portions of data each corresponding to a sub-unit thereof, and a further store containing for each sub-unit statistical duration data including a maximum value and a minimum value, wherein the determining means is operable to compute for each phonetic unit the sum of the minimum duration values and the sum of the maximum duration values for the constituent sub-unit(s) thereof and to adjust the said constant duration such that it neither falls below the sum of the minimum values nor exceeds the sum of the maximum values.

In the preferred embodiment the phonetic units are syllables and the sub-units are phonemes.

BRIEF DESCRIPTION OF THE DRAWING

One embodiment of the invention will now be described with reference to FIG. 1 which is a block diagram of a speech synthesiser.

DETAILED DESCRIPTION OF AN EXEMPLARY EMBODIMENT

Figure 1:
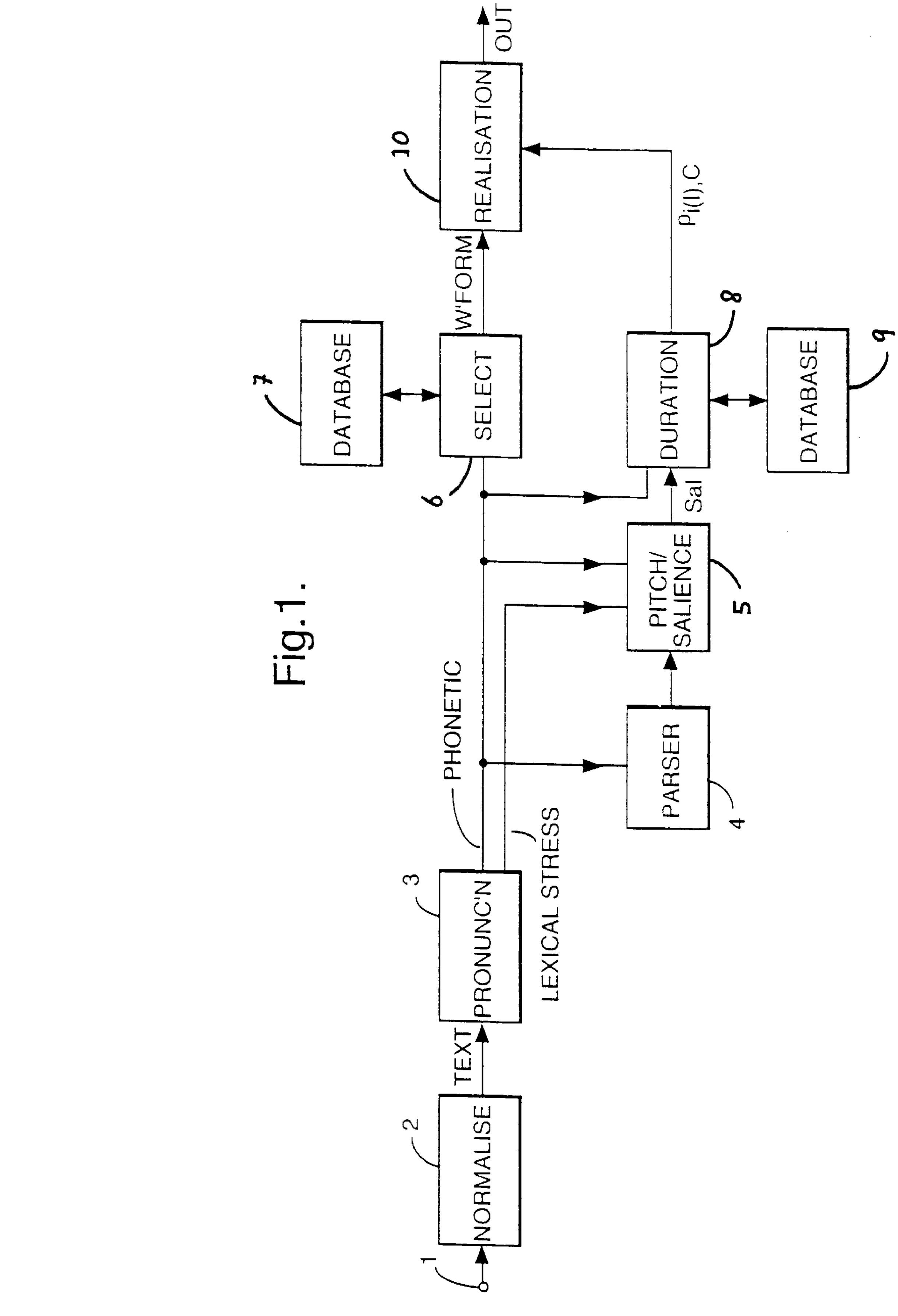

The speech synthesiser of FIG. 1 has an input 1 for receiving input text in coded form, for example in ASCII code. A text normalisation unit 2 preprocesses the text to remove symbols and numbers into words; for example an input "£100 " will be converted to "one hundred pounds". The output from this passes to a pronunciation unit 3 which converts the text into a phonetic representation, by the use of a dictionary or a set of rules or, more preferably, both. This unit also produces, for each syllable, a parameter indicative of the lexical stress to be placed on that syllable.

A parser 4 analyses each sentence to determine its structure in terms of the parts of speech (adjectives, nouns, verbs etc.) and generates performance structures such as major and minor phrases (a major phrase is a word or group of words delimited by silence). A pitch assignment unit 5 computes a "salience" value for each syllable based on the outputs of the units 3 and 4. This value is indicative of the relative stress given to each syllable, as a function of the lexical stress, boundaries between major and minor phrases, parts of speech and other factors. Commonly this is used to control the fundamental pitch of the synthesised speech (though arrangements for this are not shown in the Figure).

The phonetic representation from the unit 3 also passes to a selection unit 6 which has access to a database 7 containing digitised segments of speech waveform each corresponding to a respective phoneme. Preferably (though this is not essential to the invention) the database may contain a number of examples of each phoneme, recorded (by a human speaker) in different contexts, the selection unit serving to select that example whose context most closely matches the context in which the phoneme to be generated actually appears in the input text (in terms of the match between the phonemes flanking the phoneme in question. Arrangements for this type of selection are described in our co-pending European patent application No. 93306219.2. The waveform segments will (as described further below) be concatenated to produce a continuous sequence of digital waveform samples corresponding to the text received at the input 1.

The units described above are conventional in operation. However the apparatus also includes a duration calculation unit 8. This serves to produce, for each phoneme, an output indicating its duration in milliseconds (or other convenient temporal measure). Its operation is based on the idea of a regular beat rate, that is, a rate of production of syllables which is constant, or at least constant over a portion of speech. This beat may be viewed as defining a period of time into which the syllable must be fitted if possible, though as will be seen, the actual duration will at times deviate from this period. The apparatus shown assumes a fixed underlying beat rate but the setting of this may be changed by the user. A typical rate might be 0.015 beats/ms (i.e. a beat period of 66.7 ms).

The duration unit 8 has access to a database 9 containing statistical information for each phoneme, as follows:

- the minimum segmental duration $P_{i,min}$ of that phoneme
- the maximum segmental duration $P_{i,max}$ of that phoneme
- the mean or modal segmental duration $P_{i,M}$ of that phoneme it being understood that these values are stored for each phoneme $p_i$ (i =1, . . . ,n) of the set P of all legal phonemes. The modal duration is the most frequently occurring value in the distribution of phoneme lengths, this being preferred to the mean. These values may be determined from a database of annotated speech samples. Raw statistical values may be used or smoothed data such as gamma modelled durations may be used. For the best results this statistical information should be derived from speech of the same style to that to be synthesised; indeed, if the database 7 contains multiple examples of each phoneme $p_i$ the statistical information may be generated from the contents of the database 7 itself. It should also be mentioned that these values are determined only once.

The duration unit 8 proceeds as follows for each syllable j—the notation assumes that each syllable contains L phonemes (where L obviously varies from syllable to syllable) and the l'th phoneme is identified by an index i(l)—i.e. if phoneme $p_3$ is found at position 2 in the syllable then i(2)=3:

(1) determine the minimum and maximum possible duration of the syllable j—i.e.

$$Syl_{j,\min} = \sum_{l=1}^{L} p_{i(l),\min}$$

$$Syl_{j,\max} = \sum_{l=1}^{L} p_{i(l),\max}$$

The maximum and minimum values represent a first set of bounds on the syllable duration.

(2) Associated with each syllable is a factor indicating the degree of salience, obtained from the unit 5; as explained above, it is determined from information indicating how prominent the syllable is within the word and how prominent the word is within the sentence. Thus this factor is used to determine how much a given syllable may be squeezed in time. It is assumed that the salience factor $Sal_j$ (for the jth syllable) has a range from 0 to 100. A salience factor of 0 means that the syllable may be squeezed to its minimum duration $Syl_{j,min}$, whilst a salience factor of 100 indicates that it can assume the maximum duration $Syl_{j,max}$, Thus a modified minimum duration is computed as:

$$Syl'_{j,min}=Syl_{j,min}+(Syl_{j,max}-Syl_{j,min}).Sal_j/100$$

(3) Calculate the desired duration $Syl_{j,C}$ using the beat period T if this lies within the range defined by the modified minimum duration and the maximum duration, and using the modified minimum or the maximum otherwise. Viz.:

If $T<Syl'_{j,min}$ then
 $Syl_{j,C}=Syl'_{j,min}$
Otherwise
If $T>Syl_{j,max}$ then
 $Syl_{j,C}=Syl_{j,max}$
Otherwise
$Syl_{j,C}=T$ (4) Once the duration of the syllable has been determined the durations of the individual phonemes within the syllable must be determined. This is done by apportioning the available time $Syl_{j,C}$ among the L phonemes according to the relative weights of their modal durations:

first, find the proportion $r_l$ of the syllable to be occupied by the lth phoneme:

$$r_l = p_{i(l),M} \Big/ \sum_{l=1}^{l} p_{i(l),M}$$

The computed duration of the lth phoneme of the jth syllable is then obtained from:

$$P_{i(l),C}=r_l.Syl_{j,C}$$

Typically, a person does not speak at a constant rate. In particular, an utterance containing a large number of words is spoken more quickly than an utterance which contains fewer words.

For this reason, in a preferred embodiment of the present invention, a further modification is made to the phoneme duration $P_{i(l),C}$ in dependence upon the length of the major phrase which contains the phoneme in question.

In calculating this modification, a percentage increase or decrease in the phoneme duration is calculated as a simple linear function of the number of syllables in the major phrase, with a cut-off at seven syllables. The greatest percentage increase in the phoneme duration is applied when there is only one syllable in a major phrase, the modification decreasing linearly as the number of syllables increases up to seven syllables. The modification made to the duration of phonemes contained within a major phrase having more than seven syllables is the same as that made to a phoneme contained within a major phrase having seven syllables. It might in some situations be found that a cut off point at more or fewer than seven syllables is to be preferred.

In addition, it will be appreciated that non-linear functions might provide a better model of the relationship between the number of syllables within a major phrase and the duration of the syllables within it. Also, word groupings other than major phrases may be used.

Once the phoneme duration has been computed (and, in the case of the preferred embodiment, modified), a realisation unit 10 serves to receive, for each phoneme in turn, the corresponding waveform segment from the unit 6, and adjust the length of it to correspond to the computed (and, possibly modified) duration using an overlap-add technique. This is a known technique for adjusting the length of segments of speech waveform whereby portions corresponding to the pitch period of the speech are separated using overlapping window functions synchronous (for voiced speech) with pitchmarks (stored in the database 7 along with the waveforms themselves) corresponding to the original speaker's glottal excitation. It is then a simple matter to reduce or increase the duration by omitting or as the case may be repeating portions prior to adding them back together. The concatenation of one phoneme with the next may also be performed by an overlap-add process; if desired the improved overlap-add process described in our co-pending European patent application No. 95302474.2 may be used for this purpose.

As an alternative, the modification described in relation to the preferred embodiment of the present invention may be made to the modal duration of the phonemes without calculating the syllable duration.

What is claimed is:

1. A speech synthesis method comprising:

supplying a sequence or representations of phonetic units;

retrieving stored portions of data to generate waveforms corresponding to the phonetic units;

determining durations for the phonetic units; and processing the portions of data to adjust the time durations of the waveforms according to the determined durations;

wherein the determining step is operable to define a constant duration for said phonetic unit, said constant duration corresponding to a regular beat period and selectively in dependence on the intrinsic duration of the phonetic unit and/or its context within the sequence, to carry out a constant duration regulation calculation.

2. A speech synthesis method as in claim 1 further comprising:

identifying major phrases in said sequence;

wherein the determining step further adjusts said durations for the phonetic units in dependence upon the number of phonetic units falling within a major phrase.

3. A speech synthesis method as in claim 1 in which the phonetic units are syllables.

4. A speech synthesis method as in claim 1 including:

storing items of data representing waveforms corresponding to phonetic sub-units, the retrieving step retrieving for each phonetic unit, one or more portions of data each corresponding to a sub-unit thereof, and further storing for each sub-unit statistical duration data including a maximum value and a minimum value;

wherein the determining step computes for each phonetic unit the sum of the minimum duration values and the sum of the maximum duration values for the constituent sub-unit(s) thereof and adjusts the said constant duration such that it neither falls below the sum of the minimum values nor exceeds the sum of the maximum values.

5. A speech synthesis method as in claim 4 in which the sub-units are phonemes.

6. A speech synthesis method comprising:

supplying a sequence of representations of phonetic units;

retrieving stored portions of data to generate waveforms corresponding to the phonetic units;

determining durations for the phonetic units;

processing the portions of data to adjust the time durations of the waveforms according to the determined durations;

wherein the determining step is operable to define a constant duration corresponding to a regular beat period and to adjust that duration in dependence on the intrinsic duration of the phonetic unit and/or its context within the sequence, storing items of data representing waveforms corresponding to phonetic sub-units, the retrieving step retrieving for each phonetic unit, one or more portions of data each corresponding to a sub-unit thereof, and further storing for each sub-unit statistical duration data including a maximum value and a minimum value;

wherein the determining step computes for each phonetic unit the sum of the minimum duration values and the sum of the maximum duration values for the constituent sub-unit(s) thereof and adjusts the said constant duration such that it neither falls below the sum of the minimum values nor exceeds the sum of the maximum values;

wherein said determining step adjusts the said constant duration value such that it does not fall below a modified minimum value which exceeds the sum of the minimum values to an extent determined by the context of the phonetic unit.

7. A speech synthesis method comprising:

supplying a sequence of representations of phonetic units;

retrieving stored portions of data to generate waveforms corresponding to the phonetic units;

determining durations for the phonetic units;

processing the portions of data to adjust the time durations of the waveforms according to the determined durations;

wherein the determining step is operable to define a constant duration corresponding to a regular beat period and to adjust that duration in dependence on the intrinsic duration of the phonetic unit and/or its context within the sequence, storing items of data representing waveforms corresponding to phonetic sub-units, the retrieving step retrieving for each phonetic unit, one or more portions of data each corresponding to a sub-unit thereof, and further storing for each sub-unit statistical duration data including a maximum value and a minimum value;

wherein the determining step computes for each phonetic unit the sum of the minimum duration values and the sum of the maximum duration values for the constituent sub-unit(s) thereof and adjusts the said constant duration such that it neither falls below the sum of the minimum values nor exceeds the sum of the maximum values;

wherein the statistical duration data include for each sub-unit a central value, and each sub-unit of a phonetic unit is assigned a duration which is a fraction of the adjusted constant value for that phonetic unit in proportion to the ratio of the central value for that sub-unit to the sum of the central values for the constituent sub-units of that phonetic unit.

8. A speech synthesis method comprising:

supplying a sequence of representations of phonetic units;

retrieving stored portions of data to generate waveforms corresponding to the phonetic units;

determining durations for the phonetic units; and processing the portions of data to adjust the time durations of the waveforms according to the determined durations;

wherein the determining step is operable to:

a) determine bounds for said duration, said bounds depending on the intrinsic duration of the phonetic unit and/or its context within the sequence; and b) assign a constant duration corresponding to a regular beat period to said phonetic unit provided said constant duration does not transgress said bounds.

9. A speech synthesis method as in claim 8 in which the phonetic units are syllables.

10. A speech synthesis method comprising:

supplying a sequence of representations of phonetic units;

retrieving stored portions of data to generate waveforms corresponding to the phonetic units;

determining durations for the phonetic units; and processing the portions of data to adjust the time durations of the waveforms according to the determined durations;

wherein the determining step is operable to:

a) determine bounds for said duration, said bounds depending on the intrinsic duration of the phonetic unit and/or its context within the sequence; and b) assign a constant duration corresponding to a regular beat period to said phonetic unit provided said constant duration does not transgress said bounds, the retrieving step retrieving for each phonetic unit, one or more portions of data each corresponding to a sub-unit thereof, and the determining step computing for each phonetic unit the sum of minimum duration values and the sum of maximum duration values for the constituent sub-unit(s) thereof and correcting the said constant duration if the computed constant duration falls below the sum of the minimum values or exceeds the sum of the maximum values.

11. A speech synthesis method as in claim 10 in which the sub-units are phonemes.

12. A speech synthesis method as in claim 10 in which the determining step is operable to adjust the said constant duration value such that it does not fall below a modified minimum value which exceeds the sum of the minimum values to an extent determined by the context of the phonetic unit.

13. A speech synthesis method as in claim 10 in which:

the statistical duration data include for each sub-unit a central value, and including assigning to each sub-unit of a phonetic unit a duration which is a fraction of the adjusted constant value for that phonetic unit in proportion to the ratio of the central value for that sub-unit to the sum of the central values for the constituent sub-units of that phonetic unit.

14. A speech synthesiser comprising:

means for supplying a sequence of representations of phonetic units;

means for retrieving stored portions of data to generate waveforms corresponding to the phonetic units;

means for determining durations for the phonetic units; and means for processing the portions of data to adjust the time durations of the waveforms according to the determined durations;

wherein the determining means is operable to define a constant duration for said phonetic unit, said constant duration corresponding to a regular beat period and selectively in dependence on the intrinsic duration of the phonetic unit and/or its context within the sequence, to carry out a constant duration regulation calculation.

15. A speech synthesiser as in claim 14 further comprising:

means for identifying major phrases in said sequence;

wherein the determining means further adjust said durations for the phonetic units in dependence upon the number of phonetic units falling within a major phrase.

16. A speech synthesiser as in claim 14 in which the phonetic units are syllables.

17. A speech synthesis as in claim 14 including:

a store containing items of data representing waveforms corresponding to phonetic sub-units, the retrieving means being operable to retrieve, for each phonetic unit one or more portions of data each corresponding to a sub-unit thereof, and a further store containing for each sub-unit statistical duration data including a maximum value and a minimum value, wherein the determining means is operable to compute for each phonetic unit the sum of the minimum duration values and the sum of the maximum duration values for the constituent sub-unit(s) thereof and to adjust the said constant duration such that it neither falls below the sum of the minimum values nor exceeds the sum of the maximum values.

18. A speech synthesiser as in claim 17 in which the sub-units are phonemes.

19. A speech synthesiser comprising:

means for supplying a sequence of representations of phonetic units;

means for retrieving stored portions of data to generate waveforms corresponding to the phonetic units;

means for determining durations for the phonetic units;

means for processing the portions of data to adjust the time durations of the waveforms according to the determined durations;

wherein the determining means is operable to define a constant duration corresponding to a regular beat period and to adjust that duration in dependence on the nature of the phonetic unit and/or its context within the sequence;

a store containing items of data representing waveforms corresponding to phonetic sub-units, the retrieving means being operable to retrieve, for each phonetic unit, one or more portions of data each corresponding to a sub-unit thereof, and a further store containing for each sub-unit statistical duration data including a maximum value and a minimum value, wherein the determining means is operable to compute for each phonetic unit the sum of the minimum duration values and the sum of the maximum duration values for the constituent sub-unit(s) thereof and to adjust the said constant duration such that it neither falls below the sum of the minimum values nor exceeds the sum of the maximum values; and wherein the determining means is operable to adjust the said constant duration value such that it does not fall below a modified minimum value which exceeds the sum of the minimum values to an extent determined by the context of the phonetic unit.

20. A speech synthesiser comprising:

means for supplying a sequence of representations of phonetic units;

means for retrieving stored portions of data to generate waveforms corresponding to the phonetic units;

means for determining durations for the phonetic units;

means for processing the portions of data to adjust the time durations of the waveforms according to the determined durations;

wherein the determining, means is operable to define a constant duration corresponding to a regular beat period and to adjust that duration in dependence on the nature of the phonetic unit and/or its context within the sequence;

a store containing items of data representing waveforms corresponding to phonetic sub-units, the retrieving means being operable to retrieve, for each phonetic unit, one or more portions of data each corresponding to sub-unit thereof, and a further store containing for each sub-unit statistical duration data including a maximum value and a minimum value, wherein the determining means is operable to compute for each phonetic unit the sum of the minimum duration values and the sum of the maximum duration values for the constituent sub-unit(s) thereof and to adjust the said constant duration such that it neither falls below the sum of the minimum values nor exceeds the sum of the maximum values; and wherein the statistical duration data include for each sub-unit a central value, and means to assign to each sub-unit of a phonetic unit a duration which is a fraction of the adjusted constant value for that phonetic unit in proportion to the ratio of the central value for that sub-unit to the sum of the central values for the constituent sub-units of that phonetic unit.

21. A speech synthesizer comprising:

means for supplying a sequence of representations of phonetic units;

means for retrieving stored portions of data to generate waveforms corresponding to the phonetic units;

means for determining durations for the phonetic units; and means for processing the portions of data to adjust the time durations of the waveforms according to the determined durations;

wherein the determining means is operable to:

a) determine bounds for said duration, said bounds depending on the intrinsic duration of the phonetic unit and/or its context within the sequence; and b) assign a constant duration corresponding to a regular beat period to said phonetic unit provided said constant duration does not transgress said bounds.

22. A speech synthesizer as in claim 21 which the phonetic units are syllables.

23. A speech synthesizer comprising:

means for supplying a sequence of representations of phonetic units;

means for retrieving stored portions of data to generate waveforms corresponding to the phonetic units;

means for determining durations for the phonetic units; and means for processing the portions of data to adjust the time durations of the waveforms according to the determined durations;

wherein the determining means is operable to:

a) determine bounds for said duration, said bounds depending on the intrinsic duration of the phonetic unit and/or its context within the sequence; and b) assign a constant duration corresponding to a regular beat period to said phonetic unit provided said constant duration does not transgress said bounds, a store containing items of data representing waveforms corresponding to phonetic sub-units, the retrieving means being operable to retrieve, for each phonetic unit, one or more portions of data each corresponding to a sub-unit thereof, and a further store containing for each sub-unit statistical duration data including a maximum value and a minimum value, wherein the determining means is operable to compute for each phonetic unit the sum of the minimum duration values and the sum of the maximum duration values for the constituent sub-unit(s) thereof and to correct the said constant duration if the computed constant duration falls below the sum of minimum values or exceeds the sum of the maximum values.

24. A speech synthesizer as in claim 23 in which the sub-units are phonemes.

25. A speech synthesizer as in claim 23 in which the determining means is operable to adjust the said constant duration value such that it does not fall below a modified minimum value which exceeds the sum of the minimum values to an extent determined by the context of the phonetic unit.

26. A speech synthesizer as in claim 23 in which:

the statistical duration data include for each sub-unit a central value, and including means to assign to each sub-unit of a phonetic unit a duration which is a fraction of the adjusted constant value for that phonetic unit is proportion to the ratio of the central value for that sub-unit to the sum of the central values for the constituent sub-units of that phonetic unit.

* * * * *